United States Patent [19]

Ono

[11] Patent Number: 5,817,389

[45] Date of Patent: Oct. 6, 1998

[54] OPTICAL DISK

[75] Inventor: Masumi Ono, Tokyo, Japan

[73] Assignee: Sony Corporation, Tokyo, Japan

[21] Appl. No.: 738,589

[22] Filed: Oct. 29, 1996

[30] Foreign Application Priority Data

Oct. 31, 1995 [JP] Japan .................. 7-284240

[51] Int. Cl.[6] ........................................ B32B 3/00
[52] U.S. Cl. .................. 428/64.1; 428/64.4; 428/64.5; 428/64.6; 428/64.7; 428/64.8; 428/913; 430/270.13; 430/270.14; 430/495.1; 430/945; 369/283; 369/288
[58] Field of Search .......................... 428/64.1, 64.2, 428/64.4, 64.5, 64.6, 64.7, 64.8, 913; 430/270.12, 270.13, 270.14, 495.1, 913; 369/275.1, 283, 288

[56] References Cited

U.S. PATENT DOCUMENTS 5,569,517  10/1996  Tominaga et al. ................. 428/64.1
5,604,002  2/1997  Tsujioka et al. ................... 428/64.1

Primary Examiner—Elizabeth Evans
Attorney, Agent, or Firm—Hill & Simpson

[57] ABSTRACT

It is an object of the present invention to increase an amount of information recorded on an optical disk having at least two information recording layers. An optical disk having a plurality of information recording layers according to the present invention includes a transparent substrate, a transparent layer and at least two information recording layers formed on the transparent substrate. The information recording layers are provided so as to sandwich the transparent layer. At least one of the information recording layers has a transmittance varying layer. The transmittance varying layer is made of a material whose transmittance is changed at a predetermined temperature as a threshold value. The transmittance varying layer is made of a phase change material. The threshold value is within the temperature range from 700° to 500°. Crystallization speed of the transmittance varying layer is equal to or slower than 500 ns.

8 Claims, 5 Drawing Sheets

OPTICAL DISK

BACKGROUND OF THE INVENTION

1. Field of the Invention

The present invention relates a read-only optical disk and more particularly to an optical disk having at least two information recording layers.

2. Description of the Related Art

Optical disks such as a digital audio disk (a so-called compact disk), a video disk or the like are known as an information recording medium. When information is recorded on an optical disk, the information is recorded as phase pits formed along a circumference-direction track or the like. The typical phase pits are a large number of minute convex or concave portions formed discontinuously along the track. Therefore, the phase pits and portions where no phase pit is formed are alternately formed along the track.

When information is reproduced from the optical disk, rays of laser light are irradiated on the optical disk which is being rotated. When the rays of laser light are irradiated on the land, the rays of laser light are reflected by the land as they are. On the other hand, when the rays of laser light are irradiated on the phase pit, diffraction occurs and diffracted light is dispersed to both sides. The diffracted light from the phase pit and the reflected light from the land are detected by a photodetector.

Intensity of the diffracted light detected by the photodetector is sufficiently small as compared with that of the reflected light from the land. Therefore, the photodetector can discriminate the diffracted light from the phase pit and the reflected light from the land. The photodetector converts an amount of detected received light into a current signal. Thus, the phase pit and the land are encoded.

To increase a recording density of the optical disk, a length t of the phase pit and a pitch p thereof may be set smaller. However, resolution of information reproduction depends upon a radiation-spot diameter D. To discriminate the phase pit and the land without intersymbolic interference, the radiation-spot diameter D must be sufficiently small as compared with the pitch p of the phase pit. Therefore, when the length t of the phase pit and the pitch p thereof are set smaller to increase the recording density of the optical disk, the radiation-spot diameter D must be set smaller.

The radiation-spot diameter D is generally in proportion to a ratio $\lambda/NA$ of a wavelength $\lambda$ of light from a light source to a numerical aperture NA of an objective lens. Therefore, although it is preferable that, to reduce the radiation-spot diameter D, the wavelength $\lambda$ of the light from the light source is set shorter or the numerical aperture NA of the objective lens is set larger, it is difficult because of various conditions.

A super-high-density information recording optical disk having a phase pit pitch p which is sufficiently small as compared with a radiation-spot diameter D is manufactured to reproduce information therefrom. This reproduction is called a super high resolution or super resolution (SR) information reproduction. Examples thereof are disclosed in Japanese patent applications Nos. 94452/1990, 291773/1990 and 249511/1991 which were filed by the same assignee as that of this application. Summary of these applications will hereinafter be described.

FIGS. 1A and 1B show an example of an arrangement of a super high density information recording optical disk. FIGS. 1A and 1B are cross-sectional views of the optical disks each of which is cut along a perpendicular plane in the diameter direction. An optical disk shown in FIG. 1A has a transparent substrate 11 having phase pits 11P formed thereon and also has a transmittance varying layer (reflectivity varying layer) 13 disposed on the phase pit 11P. The transmittance varying layer 13 is made of a material whose light transmittance (reflectivity) is remarkably changed reversibly as its temperature is increased by irradiation of laser light thereon.

An optical disk shown in FIG. 1B has dielectric protective layers 12, 14 provided on the upper and lower sides of the transmittance varying layer (reflectivity varying layer) 13, and further has a reflective layer 15 formed on the dielectric protective layer 14. Therefore, the optical disk has the transparent substrate 11, the first dielectric protective layer 12, the transmittance varying layer 13, the second dielectric protective layer 14 and the reflective layer 15.

A principle of the super high resolving power or super resolution information reproduction will be described with reference to FIGS. 2A to 2D. FIG. 2A is a partially enlarged, plan view of an information recording surface of the optical disk. A large number of minute phase pits 103 are formed along a track 101 on the information recording surface. As shown in FIG. 2A, the length of the phase pit 103 and the pitch between the two adjacent phase pits 103 are marked with reference symbols D, p, respectively. It is assumed that a radiation spot 201 formed by the laser light scans along the track 101 in the direction shown by an arrow A in FIG. 2A. Although the phase pit 103 is practically moved relative to the radiation spot 201 since the optical disk is rotated, the principle will be described on the above assumption to simplify the description.

Since the rays of the laser light are irradiated on the optical disk, a portion thereof where the radiation spot 201 is formed by irradiation of the laser light is heated. However, since the radiation spot 201 scans in the direction shown by the arrow A, a portion of the optical disk where the radiation spot 201 has just passed has the most high temperature rather than the portion where the radiation spot 201 is now formed. In FIG. 2A, a high-temperature portion where a temperature is higher than a predetermined threshold temperature, e.g., a melting point MP is an ellipse portion.

FIG. 2B two-dimensionally shows a light intensity and a temperature distribution in the track direction. In FIG. 2B, a curve 301 represents distribution of a light intensity obtained on the radiation spot 201 formed on a surface of the optical disk, and a curve 302 represents a temperature distribution of the transmittance varying layer 13.

FIG. 2C shows change of the reflectivity of the material used for making the transmittance varying layer 13. The reflectivity of the material is changed depending upon the change of the temperature. The reflectivity becomes remarkably high at the high temperature portion 202 and becomes remarkably low at an area other than the high temperature portion 202, i.e., at a low temperature area. Therefore, the reflected light is detected from the high temperature portion 202 of the radiation spot 201, i.e., from a common portion (cross-hatched portion) 203 of the area of the radiation spot 201 and the area of the high temperature portion 202. Such common portion (cross-hatched portion) 203 is a substantial radiation spot and referred to as a substantial radiation spot.

FIG. 2D shows change of the reflectivity of another material used for making the transmittance varying layer 13. The reflectivity of this material becomes remarkably low at the high temperature portion 202 and becomes remarkably high at an area other than the high temperature portion 202, i.e., at a low temperature area. For example, this material has high reflectivity at an ordinary or room temperature. Therefore, the reflected light is detected from a portion 204 which is an area of the radiated spot 201 except the area of the high temperature portion 202. Such portion 204 is a substantial radiation spot and referred to as a substantial radiation spot.

It is not the track-direction diameter of the actual radiation spot 201 but the track-direction diameters of the substantial radiation spots 203, 204 which affect the resolving power with respect to the phase pit of the optical disk. In FIG. 2A, since the diameters of the substantial radiation spots 203, 204 are substantially half of the diameter of the radiation spot 201, even if the pitch p of the phase pit 103 is half as long as the ordinary pitch, then the phase pits 103 can be resolved. Specifically, the resolving power becomes double.

In general, the diameters of the substantial radiation spots 203, 204 are determined depending upon relationship between the radiation spot 201 and the area of the high temperature portion 202. Therefore, by properly selecting the material of the transmittance varying layer 13 and a condition of thermal conductivity at a peripheral portion of the transmittance varying layer 13, it is possible to set the diameters of the substantial radiation spots 203, 204 to desired values. This can be realized by selecting thicknesses of the dielectric protective layers 12, 14 to be desired values.

A material whose reflectivity (transmittance) is remarkably changed depending upon its temperature includes a material whose reflectivity (transmittance) is remarkably changed as a phase is changed. Phase change includes phase change among a crystalline state, an amorphous state, a molten state and so on. Typically, the reflectivity (transmittance) is changed at a melting point MP as a threshold value. There are two kinds of materials: one material whose reflectivity is low in its crystalline state (solid state) but is high in its molten state (liquid state) as shown by a curve of FIG. 2C; and a material whose reflectivity is high in its crystalline state (solid state) but is low in its molten state (liquid state) as shown by a curve of FIG. 2D. The former is called a rear aperture detection (RAD) type material and the latter is called a front aperture detection (FAD) type material.

Other than the phase change material, various organic dyes, an interference filter and so on are employed as a material of the transmittance varying layer (reflectivity varying layer). For example, the reflectivity (transmittance) of the organic dye material is changed depending upon an intensity of radiated light. In this case, the diameter of the substantial radiation spot is one obtained when the light intensity represented by the light intensity curve 301 of FIG. 2B is larger than a predetermined threshold value, and the diameter is smaller than an actual diameter of the radiation spot 201. Details are described in the above applications.

For increasing the recording density of the optical disk, it is proposed to provide a plurality of information recording surfaces other than to reduce the length t of the phase pit and the pitch p thereof.

A structure of an optical disk having a plurality of information recording surfaces will be described with reference to FIG. 3. The optical disk has a transparent substrate 11, a first information recording layer 10 deposited thereon, a transparent layer 19 deposited thereon, and a second information recording layer 20 deposited thereon.

Phase pits 11P, 19P are respectively formed on the transparent substrate 11 and the transparent layer 19. The first information recording layer 10 is formed of a semitransparent reflective film, and the second information recording layer 20 is formed of a reflective layer.

An example of an apparatus for recording and reproducing the optical disk having a plurality of information recording surfaces will be described with reference to FIG. 4. The recording and reproducing apparatus has a light source 31 formed of a semiconductor laser, a collimator lens 33, a beam splitter 35, a quarter-wave plate 37, an objective lens 39, a condenser lens 41, a cylindrical lens 43, and a photosensor 45 formed of a photodiode.

Laser light from the light source 31 is converted by the collimator lens 33 into parallel rays of laser light. The parallel rays of laser light pass through the beam splitter 35 and travel to the quarter-wave plate 37. The quarter-wave plate 37 subjects the laser light to linear polarization and then the objective lens 39 focuses the linearly polarized laser light.

Rays of laser light reflected by the information recording layers 10, 20 of an optical disk 1 pass through the quarter-wave plate 37 and travel to the beam splitter 35. The beam splitter 35 deflects an optical path of the reflected light, thereby the reflected light passing through the condenser lens 41 and the cylindrical lens 43. The reflected light is then detected by the photodetector 45.

The optical disk 1 has a structure shown in FIG. 3, including the first information recording layer 10 and the second information recording layer 20. An optical system of this recording and reproducing apparatus includes a known auto-focussing mechanism and a known auto-tracking mechanism. The auto-focusing mechanism shifts the objective lens 39 in the direction shown by an arrow B of FIG. 4, thereby the radiation spot 201 being formed on the first information recording layer 10 or the second information recording layer 20.

The optical disk having a plurality of information recording layers 10, 20 advantageously has a large recording capacity as compared with an optical disk having a single information recording layer.

However, since it is necessary to discriminate from which information recording layer information is being reproduced during the reproduction of the information, identification informations therefor are recorded on tracks of the respective information recording layers 10, 20. Therefore, user data of the optical disk having the two information recording layers 10, 20 are substantially small as compared with data twice of user data of the optical disk having a single information recording layer.

SUMMARY OF THE INVENTION

It is an object of the present invention to provide an optical disk having a plurality of information recording layers on which more information can be recorded.

An optical disk having a plurality of information recording layers according to the present invention includes a transparent substrate, a transparent layer and at least two information recording layers formed on the transparent substrate. The information recording layers are provided so as to sandwich the transparent layer. At least one of the information recording layers has a transmittance varying layer.

According to the present invention, the transmittance varying layer is made of a material whose transmittance is changed at a predetermined temperature as a threshold value. The transmittance varying layer is made of a phase change material. The threshold value is within the temperature range from 700° to 500°. Crystallization speed of the transmittance varying layer is equal to or slower than 500 ns.

According to the present invention, the transmittance varying layer is made of a material whose transmittance is changed at a predetermined luminous intensity as a threshold value. The transmittance varying layer is made of an organic dye material.

According to the present invention, since the read-only optical disk has a plurality of information recording layers at least one of which includes the transmittance varying layer and hence the optical disk is a multilayer optical disk allowing super high resolution reproduction, it is possible to secure a larger user-data recording area as compared with other multilayer optical disks.

DESCRIPTION OF THE PREFERRED EMBODIMENT

Figure 1A:
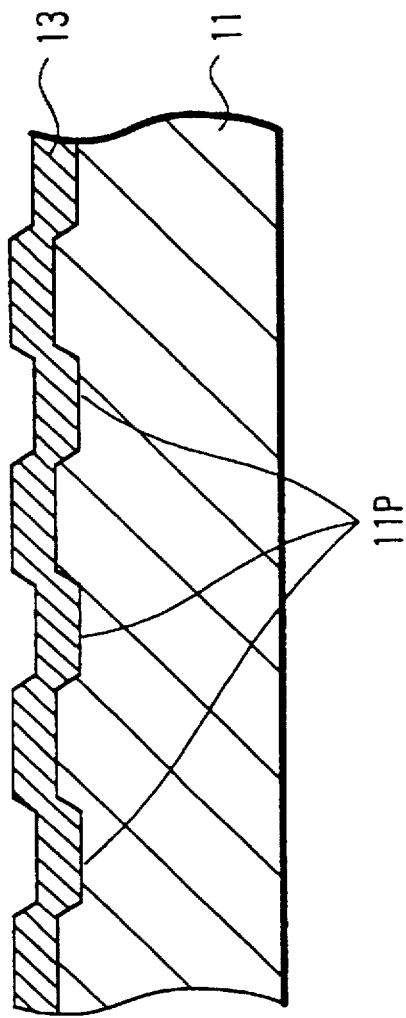
FIGS. 1A and 1B are diagrams each showing an example of an arrangement of a super high resolution information recording optical disk.
Figure 1B:
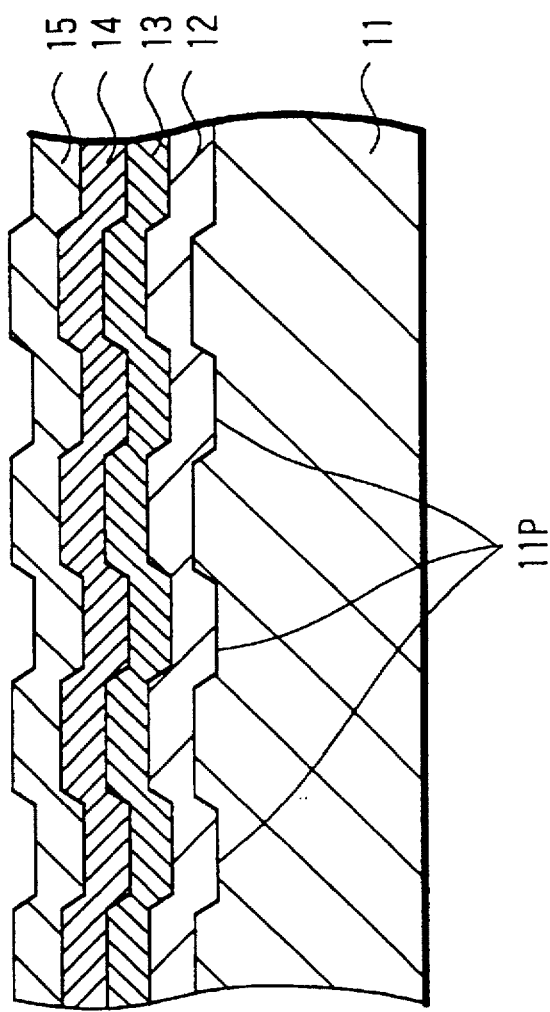
Figure 2A:
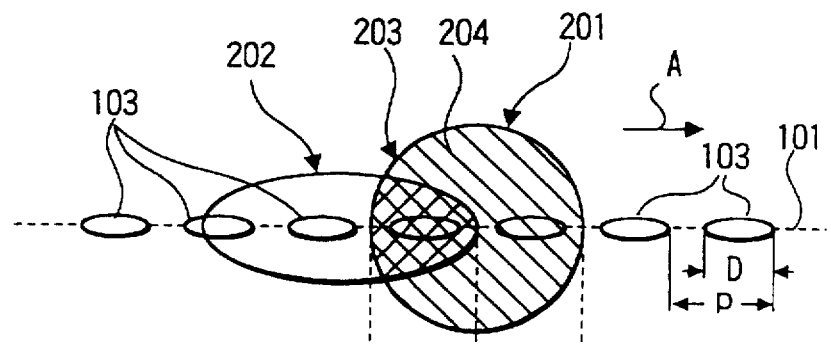
FIGS. 2A to 2D are a diagram and graphs used to explain a principle of a super high resolution information reproduction.
Figure 2B:
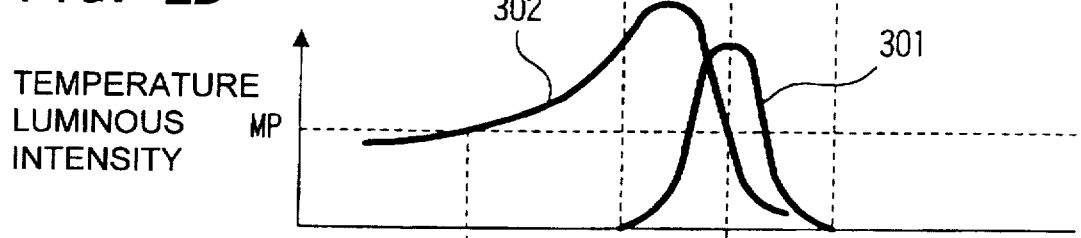
Figure 2C:
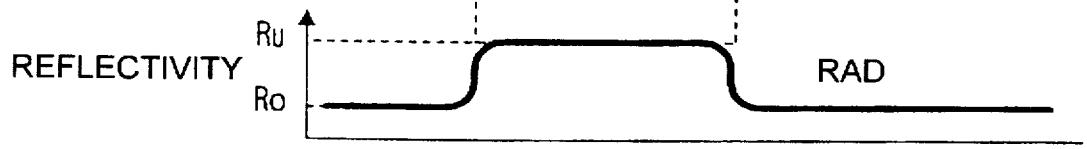
Figure 2D:

An optical disk according to an embodiment of the present invention will hereinafter be described with reference to FIG. 5. The optical disk according to the present invention has a transparent substrate 11, a first information recording layer 10, a transparent layer 19 and a second information recording layer 20. The first information recording layer 10 is formed of a semitransparent reflective layer.

The second information recording layer 20 has a first dielectric protective layer 12, a transmittance varying layer (reflectivity varying layer) 13 formed thereon, a second dielectric protective layer 14 formed thereon, a reflective layer 15 formed thereon, and a third dielectric protective layer 16 formed thereon.

Figure 3:
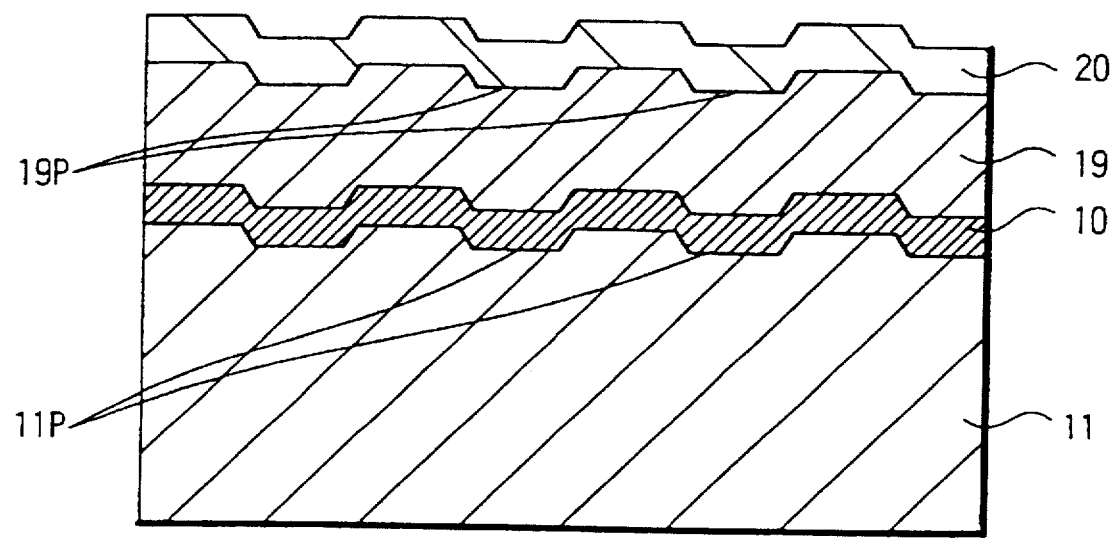
FIG. 3 is a diagram showing an example of an arrangement of an optical disk having two information recording layers.
Figure 4:
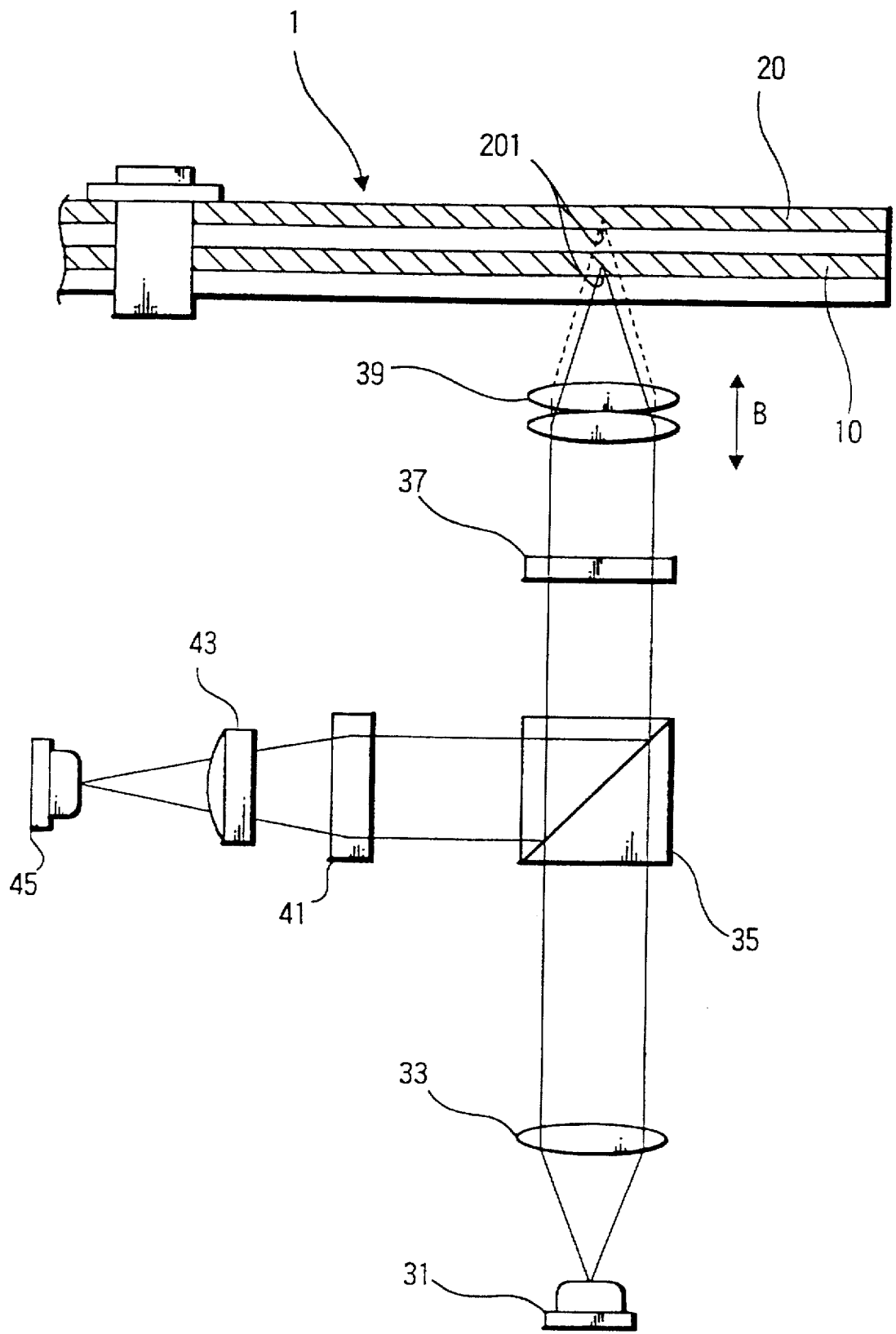
FIG. 4 is a diagram showing an example of an arrangement of an apparatus for reproducing an optical disk having two information recording layer.

The optical disk according to this embodiment is different from the optical disk shown in FIG. 3 in that the second information recording layer 20 has the transmittance varying layer 13, and may be arranged similarly thereto in other points. Any of the two dielectric protective layers 12, 14 formed on both sides of the transmittance varying layer 13, the reflective layer 15 and the third dielectric protective layer 16 may be omitted properly. When recorded information is reproduced from the optical disk according to this embodiment, the recording and reproducing apparatus shown in FIG. 4 may be used.

The dielectric protective layers are provided to protect the transmittance varying layer 13 and the reflective layer 15 and also to adjust characteristics of the transmittance varying layer 13 and the reflective layer 15. For example, by properly selecting thicknesses and materials of the dielectric protective layers, their thermal conductive characteristics are changed. This change leads to change of temperature characteristics of the transmittance varying layer 13, thereby the transmittance (reflectivity) characteristics being adjusted. The dielectric protective layers help heat to be satisfactorily radiated from the reflective layer 15.

For example, a phase change material or an organic dye material is employed as a material of the transmittance varying layer 13 of the optical disk according to this embodiment. The phase change material is reversibly changed from its crystalline state to its molten state when its temperature becomes higher than a predetermined threshold temperature. When being cooled, the phase change material is changed from its molten state to its crystalline state. At this time, it is preferable that the phase change material is free from composition change such as phase separation or the like and segregation. It is also preferable that the phase change material has less kinds of crystals and composition of the crystal is approximate to composition of a compound composition.

If the melting point of the phase change material is too high, the heating of the phase change material brings thermal load to the protective layer or the transparent layer around the phase change material. Therefore, the melting point is preferably smaller than 700°, e.g., within the range from 700° to 500°.

Time required for crystallization will be considered. For example, if a linear velocity of the optical disk is 2 to 20 m/sec. and a diameter of the beam spot on the information recording layer of the optical disk is 1 μm, then time of beam radiation is within the range from 50 to 500 nsec. Therefore, crystallization speed must be 500 nsec. or shorter.

An alloy made of three elements, e.g., $Ge_2Sb_2Te_5$ is employed as the phase change material. The phase change material may be an alloy containing at least one kinds of the following elements; Au, Al, Ag, Bi, Cu, Cr, Co, Cd, Ce, Cs, Dy, Fe, Ge, Gd, Ga, Hf, In, K, La, Li, Mn, Mo, Ni, Nb, Nd, Na, Os, Pd, Pr, Pb, Ru, Rh, Rb, Sn, Sb, Si, Sm, Sc, Se, Te, Ti, Tb, Ta, Tl, V, W, Y, Zn and Zr.

Further, such phase change material may be made of SbSe system, SbSeSi system, InSe system, InSeSi system, AgInTeSb system, AsTeGe system, TeGeSn system, TeGeSnO system, TeSe system, SnTeSe system, TeGeSnAu system, SbTeSe system, InSeTl system, InSb system, InSbSe system, AgZn alloy, CuAlNi alloy, InSeTlCo system, SiTeSn system, suboxide such as $TeOx$ ($0<x<2$) or the like, or the like.

The organic dye material employed in the transmittance varying layer 13 includes a thermochromic material whose transmittance is changed when its temperature becomes higher than a predetermined threshold temperature, and a photochromic material whose transmittance is changed when luminous intensity of received light becomes higher than a predetermined threshold luminous intensity. The thermochromic material includes polyacene class, phthalocyanine class, spiropyran dye, lactone dye, fluoran dye and so on. The photochromic material includes xanthene dye, azo dye, cyanin dye and so on.

For example, polycarbonate is employed as a material of the transparent substrate 11. However, acrylic resin such as poly(methyl methacrylate) (PMMA) or the like and glass photopolymer (2P) may be employed as a material of the transparent substrate 11. A $ZnS$—$SiO_2$ mixture may be employed as the dielectric protective layers 12, 14, 16. However, a material employed as the dielectric protective layers 12, 14, 16 may be a material having a low absorptance in a wavelength range of the laser light to be used, e.g., may be nitride, oxide, sulfide or the like of metal such as Al, Si, or the like or of a semiconductor element.

The reflective film 15 of the second information recording layer 20 is formed of a metal reflective film. It is preferable to employ dysprosium (Dy) as such metal. Such metal may be Al, Au, Ag or BiSe$_4$ or alloy of these metals and Ti, Cr or the like.

Figure 5:
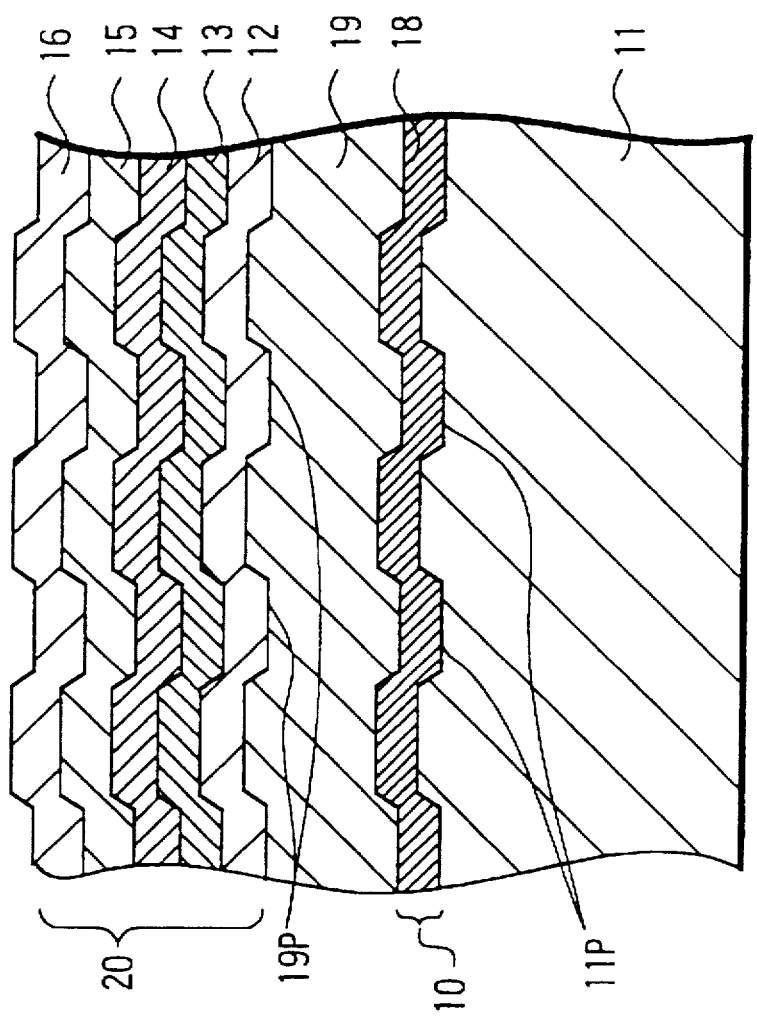
FIG. 5 is a diagram showing an example of an arrangement of an optical disk according to the present invention.

While the optical disk shown in FIG. 5 includes the two information recording layers 10, 20, the optical disk can generally be arranged so as to have the information recording layer having multilayer structure. The optical disk having the information recording layer formed of N layers (where N is an integer that is equal to or greater than 2) is arranged such that the first to (N−1)th information recording layers include semitransparent layers and the Nth information recording layer includes a reflective layer. Since the metal reflective film cannot be provided in any of the first to (N−1)th information recording layers, heat is easily accumulated in the information recording layers. Therefore, it is preferable to provide a dielectric protective layer made of a material having a comparatively high thermal conductivity in each of the first to (N−1)th information recording layers. Such dielectric protective layer may be formed of Al$_3$N$_4$, SiC or the like, for example.

An inventive example of the present invention will be described. The optical disk having the two information recording layers 10, 20 as shown in FIG. 5 was manufactured experimentally. Initially, the phase pits 11P were formed by a stamper on a main surface of the polycarbonate transparent substrate 11 to transfer first information thereto. The semitransparent layer 18 made of silicon nitride was formed on the transparent substrate 11. The transparent photopolymer layer 19 was formed on the semitransparent layer 18 by photopolymerization. The phase pits 19P were formed by a stamper on the photopolymer layer 19 to transfer second information thereto.

The dielectric protective layer 12, the transmittance varying layer 13, the dielectric protective layer 14, the reflective film 15 and the dielectric protective layer 16 were successively formed on the photopolymer layer 19 having the phase pits 19P.

An arrangement of the manufactured optical disk, materials thereof and thicknesses thereof were as shown on the following Table 1.

TABLE 1

| portion | material | thickness |
| --- | --- | --- |
| transparent substrate 11 | polycarbonate | |
| first information recording layer 10 | silicon nitride | 60 nm |
| second transparent layer 19 second information recording layer 20 | photopolymer (2P) | 40 μm |
| first dielectric protective layer 12 | ZnS–SiO$_2$ mixture | 105 nm |
| transmittance varying layer 13 | Ge$_2$Sb$_2$Te$_5$ alloy | 19 nm |
| second dielectric protective layer 14 | ZnS—SiO$_2$ mixture | 180 nm |
| reflective film 15 | dysprosium (Dy) | 150 nm |
| third dielectric protective layer 16 | ZnS—SiO$_2$ mixture | 400 nm |

Rays of laser light having a wavelength of 680 nm were irradiated on the optical disk having above structure. Reflectivities of the first and second information recording layers 10 and 20 were as shown on the following Table 2.

TABLE 2

| layer | reflectivity |
| --- | --- |
| first information recording layer 10 second information recording layer 20 | 30% |
| when transmittance varying layer 13 is in its crystalline state | 20% |
| when transmittance varying layer 13 is in its molten state | 1.6% |

Informations recorded on the first and second information recording layers 10 and 20 were satisfactorily reproduced.

According to the present invention, it is possible to perfectly and precisely reproduce information from the read-only optical disk having a plurality of information recording layers. Moreover, this advantage leads to substantial enlargement of the user area.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. An optical disk comprising in this order:

a transparent substrate;

a first recording layer on said substrate;

a transparent layer on said first recording layer; and a second recording layer on said transparent layer, said second recording comprising a transmittance varying layer and a reflective layer.

2. An optical disk according to claim 1, wherein said transmittance varying layer is made of a material whose transmittance changes at a predetermined temperature as a threshold value.

3. An optical disk according to claim 2, wherein said transmittance varying layer is made of a phase change material.

4. An optical disk according to claim 2, wherein said threshold value is within the temperature range from 700° to 500°.

5. An optical disk according to claim 3, wherein crystallization speed of said transmittance varying layer is equal to or slower than 500 ns.

6. An optical disk according to claim 1, wherein said transmittance varying layer is made of a material whose transmittance changes at a predetermined luminous intensity as a threshold value.

7. An optical disk according to claim 1, wherein said transmittance varying layer is made of an organic dye material.

8. An optical disk according to claim 1, comprising one or more additional recording layers between said first and second recording layers, each additional recording layer comprising a semi-transparent layer.

* * * * *